April 6, 1948.  F. M. BELL  2,439,123
FISH LURE
Filed Oct. 9, 1946
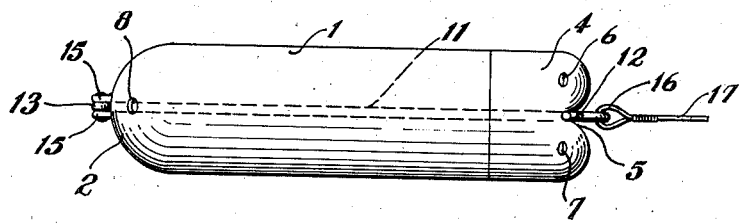
Fig. 1
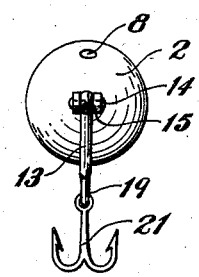
Fig. 4
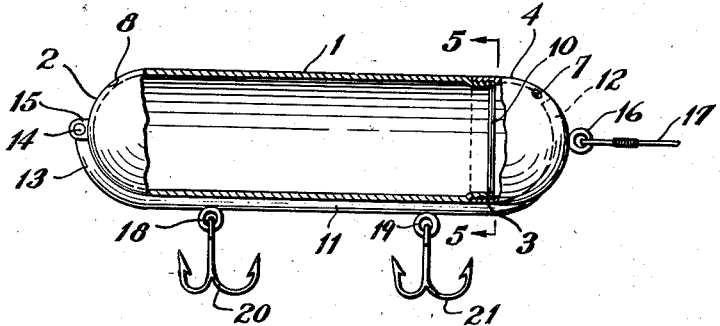
Fig. 2
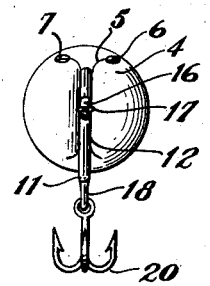
Fig. 3
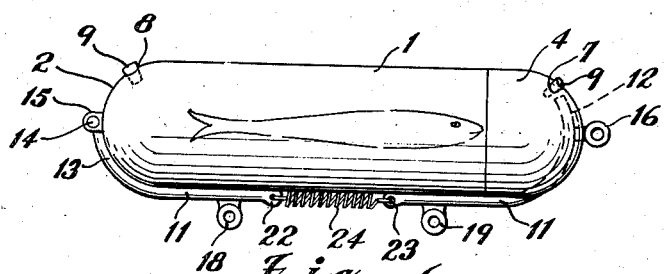
Fig. 6
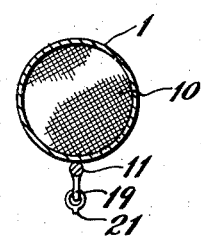
Fig. 5
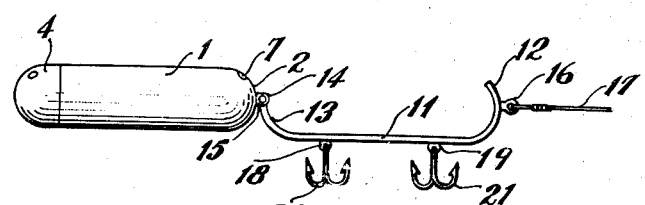
Fig. 8  Fig. 7
Inventor
Fannie M. Bell
By Clarence A. O'Brien
and Harvey B. Jacobson
Attorneys

Patented Apr. 6, 1948

2,439,123

UNITED STATES PATENT OFFICE 2,439,123

FISH LURE

Fannie M. Bell, Bellevue, Ohio

Application October 9, 1946, Serial No. 702,302

3 Claims. (Cl. 43—41)

This invention relates to improvements in fish lures.

An object of the invention is to provide an improved fish lure adapted to be attached to a fishing line, including a transparent tubular shaped hollow body having a removable cap closure ported on its forward end and adapted to hold either live or artificial bait, and a resilient hook supporting clip pivoted to the rear end of said body and extending along the same to be snapped over the forward end thereof.

Another object of the invention is to provide an improved hollow transparent fish lure having a removable closure cap at one end and formed with vents in its opposite ends whereby either live bait such as minnows and frogs may be received in said lure when said vent are left open, and when said vents are closed by suitable plugs, artificial bait or non-water living line bait such as grasshoppers and the like may be received within the body of said lure.

A further object of the invention is to provide an improved transparent hollow bait lure in combination with a plurality of hooks, which will be highly efficient in operation, and relatively inexpensive to manufacture and produce.

Other objects will appear as the description proceeds.

In the accompanying drawings which form a part of this application,

Figure 1 is a top plan view of the improved fish lure;

Figure 2 is a side elevation of the fish lure being partly broken away and in section to show the interior thereof;

Figure 3 is a front end view of the improved fish lure;

Figure 4 is a rear end view of the improved fish lure;

Figure 5 is a sectional view taken on the line 5—5 of Figure 2;

Figure 6 is a side elevation of a slightly modified form of fish lure having a coil spring interposed between the adjacent ends of the hook supporting sections;

Figure 7 is a side elevation of the fish lure showing the same released from its hook supporting clip, and Figure 8 is a perspective view of three of the removable plugs used for closing the vent openings in the hollow lure body and front cap member.

Like characters of reference are used throughout the following specification and the accompanying drawings to designate corresponding parts.

In carrying out the invention, there is provided an improved fish lure used for fishing when trolling or casting, said lure comprising a hollow tubular transparent body 1 being rounded at its rear end as at 2, and being reduced and externally threaded as at 3 on its forward end.

A front cap member 4 will be internally threaded at its open end for threading on the threaded end 3 of the lure body 1. The forward end of the cap member 4 will be rounded and will be formed with a vertically extending locking seat or groove 5, and will be further formed with the spaced vents 6 and 7, while a vent 8 is formed through the rear end of said lure body 1, whereby water may circulate through said vents when a live bait such as a minnow or frog is placed in the lure and said lure is drawn through the water being fished.

If an artificial bait or live bait such as a grasshopper is used in the lure, the vents 6, 7, 8 will be plugged up by the removable plugs 9.

The wire screen 10 will be placed over the open end of the body 1 after the bait is placed therein and the cap member 4 will be screwed on the threaded opening 3 of the lure body 1.

In Figures 1 to 5 inclusive, and in Figure 7, the preferred embodiment of the invention is illustrated.

A spring wire hook supporting clip 11 is arcuately curved at its front end and rear end as at 12 and 13, respectively, said rear end 13 being detachably pivoted on the pivot pin 14 between the spaced ears 15 on the apex of the rounded rear end of the body, while the forward arcuate end 12 is adapted to snap into and be received in the vertically extending locking groove or seat 5 formed on the cap member 4. An eye 16 is provided at the forward end of the clip 11 for attaching a fishing line 17. A pair of spaced eyes 18 and 19 are formed on the clip 11 and are adapted to support the multiple barbed casting or trolling hooks 20 and 21.

In the modification of the fish lure illustrated in Figure 6, the clip 11 is formed in two portions with their adjacent inner end portions apertured at 22 and 23 to engage and support the coil tensioning spring 24.

In operation, the desired bait is placed within the transparent lure body 1 which may be made from plastic, Plexiglas, Celluloid, or any other desired material. If a live bait such as a minnow or frog is placed in the hollow body of the lure, the vents will be left open so that water may circulate through the lure body. If, however, a grasshopper or other non-water living line bait or an artificial bait is placed within the lure body, the vents will be closed by means of suitable plugs provided for that purpose. When a fish strikes a hook attached to the lure, the arcuate end 12 of the clip 11 will be pulled loose from the groove or seat 5 in the cap member 4, permitting the lure body 1 to trail out behind the clip 12 away from the jaws of the hooked fish, as clearly shown in Figure 7 of the drawings.

From the foregoing description, it will be apparent that there has been provided a highly efficient form of fish lure which may be used for either live or artificial bait.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A fish lure comprising a transparent tubular hollow body closed at one end and open at its opposite end, a removable closure member for said open end, a removable screen between said lure body and closure member, a resilient clip pivotally attached to the closed end of said lure body adapted to snap over said closure member when disposed upon said lure body for securing the same in place, eyes formed on said clip, fish hooks suspended from said eyes, and an eye on the end of said clip remote from its pivoted end for attaching to a fish line.

2. A fish lure comprising a transparent tubular hollow body closed at one end and open at its opposite end, a removable closure member for said open end, a removable screen between said lure body and closure member, said body being formed with vents through its opposite ends, removable plugs for closing said vents, a resilient clip pivotally attached to the closed end of said lure body adapted to snap over said closure member when disposed upon said lure body for securing the same in place, eyes formed on said clip, fish hooks suspended from said eyes, and an eye on the end of said clip remote from its pivoted end for attaching to a fish line.

3. A fish lure comprising a transparent tubular hollow body closed at one end and open at its opposite end, a removable closure member for said open end formed with a seat in its outer end, a removable screen between said lure body and closure member, said body and closure member being formed with vents, removable plugs for closing said vents, a resilient U-shaped clip pivotally attached to the closed end of said lure body adapted to extend parallel with the lure body and to snap over said closure member when disposed upon the lure body seating in the seat formed therein, eyes formed on said clip, fish hooks suspended from said eyes, and a supporting eye on the end of said clip remote from its pivoted end for supporting a fish line.

FANNIE M. BELL.

REFERENCES CITED

The following references are of record in the file of this patent:

UNITED STATES PATENTS

| Number | Name | Date |
|---|---|---|
| 315,497 | Greenholt | Apr. 14, 1885 |
| 1,415,653 | Koepke | May 9, 1922 |
| 1,424,103 | Johnson | July 25, 1922 |
| 1,470,842 | Hyams | Oct. 16, 1923 |
| 2,081,671 | Lauer | May 25, 1937 |
| 2,197,372 | Bailey | Apr. 16, 1940 |
| 1,808,565 | McLaughlin | June 2, 1931 |
| 1,986,742 | Mosher | Aug. 16, 1934 |